(12) United States Patent
Palazzo et al.

(10) Patent No.: US 7,026,791 B2
(45) Date of Patent: Apr. 11, 2006

(54) ELECTROCHEMICAL TREATMENT METHOD TO REDUCE VOLTAGE DELAY AND CELL RESISTANCE IN LITHIUM/SILVER VANADIUM OXIDE CELLS

(75) Inventors: Marcus Palazzo, North Tonawanda, NY (US); Esther S. Takeuchi, East Amherst, NY (US); Randolph Leising, Williamsville, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 255 days.

(21) Appl. No.: 10/763,945

(22) Filed: Jan. 22, 2004

(65) Prior Publication Data

US 2004/0151976 A1 Aug. 5, 2004

Related U.S. Application Data

(60) Provisional application No. 60/441,986, filed on Jan. 23, 2003.

(51) Int. Cl.
*H02J 7/00* (2006.01)
*A61N 1/18* (2006.01)

(52) U.S. Cl. .............................. 320/129; 607/4; 607/5
(58) Field of Classification Search ........ 320/129–131, 320/135, 139; 607/4, 5; 324/427; 307/116
See application file for complete search history.

(56) References Cited

U.S. PATENT DOCUMENTS

| | | | |
|---|---|---|---|
| 4,740,739 A | 4/1988 | Quammen et al. | 320/129 |
| 5,367,244 A | 11/1994 | Rose et al. | 320/141 |
| 5,598,085 A | 1/1997 | Hasler | 320/145 |
| 5,633,576 A | 5/1997 | Rose et al. | 320/160 |
| 5,739,672 A | 4/1998 | Lane | 320/139 |
| 5,801,515 A | 9/1998 | Chen et al. | 320/139 |
| 5,904,705 A | 5/1999 | Kroll et al. | 607/5 |
| 5,959,371 A | 9/1999 | Dooley et al. | 307/130 |
| 6,023,151 A | 2/2000 | Hudson et al. | 320/135 |
| 6,153,949 A | 11/2000 | Soderhall | 307/125 |
| 6,166,524 A * | 12/2000 | Takeuchi et al. | 320/132 |
| 6,274,269 B1 | 8/2001 | Gan et al. | 429/215 |
| 6,307,358 B1 | 10/2001 | Conrad | 323/282 |
| 6,426,628 B1 * | 7/2002 | Palm et al. | 324/427 |
| 6,461,771 B1 | 10/2002 | Frysz et al. | 429/233 |
| 6,826,427 B1 | 11/2004 | Fayram et al. | 607/29 |

FOREIGN PATENT DOCUMENTS

EP  1 170 810 A2  1/2002

\* cited by examiner

*Primary Examiner*—Pia Tibbits
(74) *Attorney, Agent, or Firm*—Michael F. Scalise

(57) ABSTRACT

It is known that reforming implantable defibrillator capacitors at least partially restores and preserves their charging efficiency. An industry-recognized standard is to reform implantable capacitors by pulse discharging the connected electrochemical cell about once every three months throughout the useful life of the medical device. A Li/SVO cell typically powers such devices. The present invention relates to methodologies for significantly minimizing, if not entirely eliminating, the occurrence of voltage delay and irreversible Rdc growth in the about 35% to 70% DOD region by subjecting Li/SVO cells to novel discharge regimes. At the same time, the connected capacitors in the cardiac defibrillator are reformed to maintain them at their rated breakdown voltages.

10 Claims, 2 Drawing Sheets

ELECTROCHEMICAL TREATMENT METHOD TO REDUCE VOLTAGE DELAY AND CELL RESISTANCE IN LITHIUM/SILVER VANADIUM OXIDE CELLS

CROSS-REFERENCE TO RELATED APPLICATION

This application claims priority based on provisional application Ser. No. 60/441,986, filed Jan. 23, 2003.

BACKGROUND OF INVENTION

1. Field of the Invention

The present invention generally relates to the conversion of chemical energy to electrical energy. More particularly, this invention relates to an alkali metal electrochemical cell having reduced voltage delay and Rdc growth. A preferred couple is a lithium/silver vanadium oxide (Li/SVO) cell. In such cells, it is desirable to reduce voltage delay and permanent or irreversible Rdc growth at about 35% to 70% of depth-of-discharge (DOD) where these phenomena typically occur.

2. Prior Art

Voltage delay is a phenomenon typically exhibited in a lithium/silver vanadium oxide cell that has been depleted of about 35% to 70% of its capacity and is subjected to high current pulse discharge applications. It is theorized that vanadium compounds may become soluble in the cell electrolyte from the SVO cathode and be subsequently deposited onto the lithium surface of the anode. The resulting anode surface passivation film is electrically insulating, which leads to cell polarization.

The voltage response of a cell that does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pulses is higher than the minimum potential of the last pulse.

On the other hand, the voltage response of a cell that exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied.

Thus, decreased discharge voltages and the existence of voltage delay are undesirable characteristics of an alkali metal/silver vanadium oxide cell subjected to current pulse discharge conditions in terms of their influence on devices such as implantable medical devices including pacemakers and cardiac defibrillators. Depressed discharge voltages and voltage delay are undesirable because they limit the effectiveness and even the proper functioning of both the cell and the associated electrically powered device under current pulse discharge conditions.

Therefore, there is a need for a lithium/silver vanadium oxide cell that is dischargeable to deliver the high capacity needed for powering implantable medical devices and the like, but that experiences little, if any, voltage delay and Rdc growth during pulse discharging, especially at about 35% to 70% DOD.

SUMMARY OF THE INVENTION

It is known that reforming implantable defibrillator capacitors at least partially restores and preserves their charging efficiency. An industry-recognized standard is to reform implantable capacitors by pulse discharging the connected electrochemical cell about once every three months throughout the useful life of the medical device. Thus, the basis for the present invention is driven by the desire to substantially reduce, if not completely eliminate, voltage delay and Rdc growth in a Li/SVO cell while at the same time periodically reforming the connected capacitors to maintain them at their rated breakdown voltages. Conditioning methodologies for significantly minimizing, if not entirely eliminating, the occurrence of voltage delay and Rdc growth in the about 35% to 70% DOD region by subjecting Li/SVO cells to novel discharge regimes are described.

These and other objects of the present invention will become increasingly more apparent to those skilled in the art by reference to the following description and to the appended drawings.

DETAILED DESCRIPTION OF THE PREFERRED EMBODIMENTS

Figure 1:
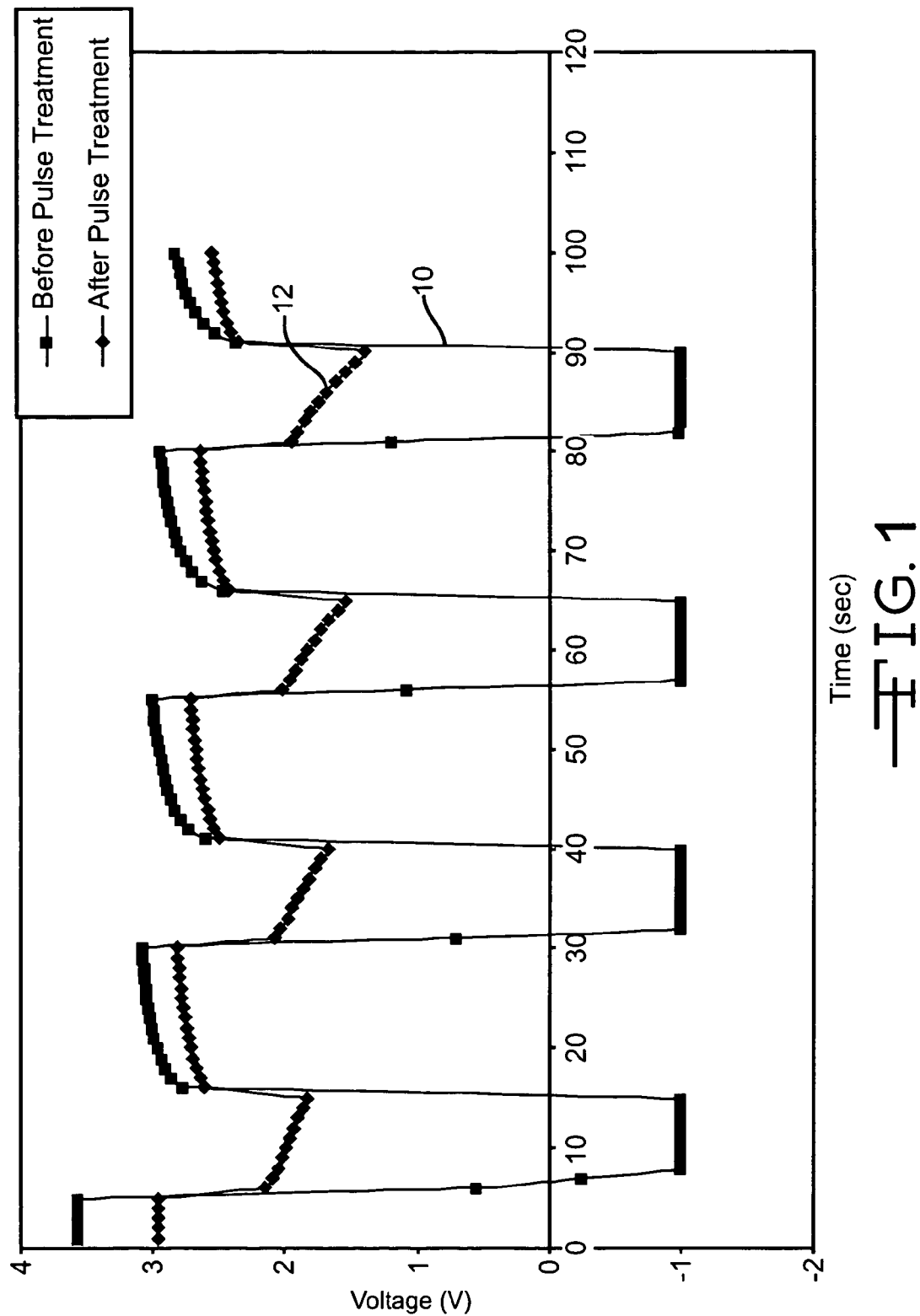
FIG. 1 is a graph constructed from the comparative discharge results of a Li/SVO cell that had its lithium anode stored in a vanadium fluoride solution prior to being pulse discharged before and after a conditioning methodology of the present invention.

The term percent of depth-of-discharge (DOD) is defined as the ratio of delivered capacity to theoretical capacity times 100.

The term "pulse" means a short burst of electrical current of significantly greater amplitude than that of a pre-pulse current immediately prior to the pulse. A pulse train consists of at least one pulse of electrical current. If the pulse train consists of more than one pulse, they are delivered in relatively short succession with or without open circuit rest between the pulses. An exemplary pulse train may consist of four 10-second pulses (23.2 $mA/cm^2$) with about a 10 to 30 second rest, preferably about 15 second rest, between each pulse. A typically used range of current densities for cells powering implantable medical devices is from about 15 $mA/cm^2$ to about 50 $mA/cm^2$, and more preferably from about 18 $mA/cm^2$ to about 35 $mA/cm^2$. Typically, a 10 second pulse is suitable for medical implantable applications. However, it could be significantly shorter or longer depending on the specific cell design and chemistry. Current densities are based on square centimeters of the cathode electrode.

An electrochemical cell that possesses sufficient energy density and discharge capacity required to meet the vigorous requirements of implantable medical devices comprises an anode of a metal selected from Groups IA, IIA and IIIB of the Periodic Table of the Elements. Such anode active materials include lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow a low surface cell design.

The electrochemical cell of the present invention further comprises a cathode of electrically conductive material that serves as the counter electrode. The cathode is preferably of solid materials having the general formula $SM_xV_2O_y$, where SM is a metal selected from Groups IB to VIIB and VIII of the Periodic Table of Elements, and wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$, in either its β-phase having x=0.35 and y=5.8, γ-phase having x=0.74 and y=5.37, or ε-phase having x=1.0 and y=5.5, and combinations of phases thereof.

Before fabrication into an electrode for incorporation into an electrochemical cell according to the present invention, the cathode active material is preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 99 weight percent of the cathode active material.

Cathode components for incorporation into the cell may be prepared by rolling, spreading or pressing the cathode active mixture onto a suitable current collector selected from the group consisting of stainless steel, titanium, tantalum, platinum, nickel, and gold. Cathodes prepared as described above may be in the form of one or more plates operatively associated with at least one or more plates of anode material or, in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, a polytetrafluoroethylene membrane commercially available under the designation ZITEX® (Chemplast Inc.), a polypropylene membrane commercially available under the designation CELGARD® (Celanese Plastic Company, Inc.), a membrane commercially available under the designation DEXIGLAS® (C.H. Dexter, Div., Dexter Corp.), and a membrane commercially available under the designation TONEN®.

The electrochemical cell of the present invention further includes a nonaqueous, ionically conductive electrolyte serving as a medium for migration of ions between the anode and the cathode electrodes during electrochemical reactions of the cell. The electrochemical reaction at the electrodes involves conversion of ions in atomic or molecular forms that migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a mixture of aprotic organic solvents comprising a low viscosity solvent and a high permittivity solvent. In the case of an anode comprising lithium, preferred lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

An exemplary implantable medical device powered by a Li/SVO cell is a cardiac defibrillator, which requires a power source for a generally medium rate, constant resistance load component provided by circuits performing such functions as, for example, the heart sensing and pacing functions. This requires electrical current of about 1 microampere to about 100 milliamperes. From time-to-time, the cardiac defibrillator may require a generally high rate, pulse discharge load component that occurs, for example, during charging of a capacitor in the defibrillator for the purpose of delivering an electrical shock therapy to the heart to treat tachyarrhythmias, the irregular, rapid heartbeats that can be fatal if left uncorrected. This requires electrical current of about 1 ampere to about 4 amperes.

In order to model Li/SVO cells for their electrochemical characteristics, several accelerated discharge regimes are commonly used in the industry. One consists of discharging a Li/SVO cell under a 17.4 kΩ load with superimposed pulse trains applied every 60 days. The pulse trains consist of four 2.0 amp pulses of constant current, each of 10-second duration with about 15 seconds rest between each pulse. One such pulse train is superimposed on the background load about every 2 months. This type of discharge is termed 1 year accelerated discharge data (1 Year ADD). Table 1 lists other industry standard ADD tests and the interval between each pulse train. The pulse intervals are applicable for tests performed at 37° C.

TABLE 1

| Test Type | Pulse Interval |
| --- | --- |
| 1 Year ADD | 2 months |
| 3 Year ADD | 4 months |
| 5 Year ADD | 6 months |
| 36 Month ADD | 3 months |
| 60 Month ADD | 5 months |

One issue relative to a Li/SVO cell is the existence of voltage delay and permanent Rdc growth starting at about 35% to 70% DOD. Voltage delay and Rdc growth are believed to be associated with anode surface film formation, which is influenced by the manner the cell is discharged. From extensive ADD modeling studies of Li/SVO cells, it has been discovered that the longer the ADD test time, the worse voltage delay and Rdc become. Such parameters as total discharge time to a particular % DOD, cell current density ($mA/cm^2$), the number of pulses per pulse train, and the time between pulse trains, among others, are believed to affect voltage delay and Rdc growth.

In actual defibrillator device applications, one very important parameter is the charge time to achieve a pre-determined energy for therapy delivery. In other words, the time to charge a capacitor to a required voltage is affected by voltage delay and Rdc growth. A typical cardiac defibrillator requires energy in the range of from about 40 Joules to about 70 Joules per Li/SVO cell for electrical shock therapy. The relationship is shown below:

Energy$(J)$=$I$(amp)×$V$(volt)×$t$(sec.) $t(s)$=Energy $(J)/IV$

If the required delivered energy (J) and pulsing current (amp) are both defined, then the charge time in seconds is inversely proportional to the average voltage under pulsing. Therefore, to maintain a relatively low charge time, the cell must deliver higher voltage under pulsing. This requirement is, however, compromised by the voltage delay and Rdc growth phenomena in the Li/SVO system at the middle of discharge life region (starting at about 35% DOD). Under severe conditions, cell voltage under pulsing becomes so low that the charge time is considered too long for the required therapy. This results in shortened device longevity. Since voltage delay and Rdc growth start at about 35% to 40% DOD, it is possible that only about 40% of the theoretical capacity of a particular Li/SVO cell is actually delivered. The remaining capacity is wasted. Therefore, the present invention is directed to methodologies designed to avoid or reduce the voltage delay and Rdc growth region in a Li/SVO cell.

A cardiac defibrillator essentially consists of an electrochemical cell as a power source for charging at least one electrolytic capacitor to deliver the electrical shock therapy to the patient's heart. Microprocessors powered by the cell perform the heart sensing and pacing functions and initiate capacitor charging to deliver the electrical shock therapy. Not only does the Li/SVO cell experience voltage delay and Rdc growth problems at about 35% DOD as explained above, but electrolytic capacitors can experience degradation in their charging efficiency after long periods of inactivity. It is believed that the anodes of electrolytic capacitors, which are typically of aluminum or tantalum, develop microfractures after extended periods of non-use. These microfractures consequently result in extended charge times and reduced breakdown voltages. Degraded charging efficiency ultimately requires the Li/SVO cell to progressively expend more and more energy to charge the capacitors for providing therapy.

To repair this degradation, microprocessors controlling the implantable medical device are programmed to regularly charge the electrolytic capacitors to or near a maximum-energy breakdown voltage (the voltage corresponding to maximum energy) before discharging them internally through a non-therapeutic load. The capacitors can be immediately discharged once the maximum-energy voltage is reached or they can be held at maximum-energy voltage for a period of time, which can be rather short, before being discharged. These periodic charge-discharge or charge-hold-discharge cycles for capacitor maintenance are called "reforms." Reforming implantable defibrillator capacitors at least partially restores and preserves their charging efficiency.

An industry-recognized standard is to reform implantable capacitors by pulse discharging the connected electrochemical cell about once every three months throughout the useful life of the medical device, which is typically dictated by the life of the cell. Thus, the basis for the present invention is driven by the desire to substantially reduce, if not completely eliminate, voltage delay and Rdc growth in a Li/SVO cell while at the same time periodically reforming the connected capacitors to maintain them at their rated breakdown voltages. Therefore, the present invention relates to regimes for significantly minimizing, if not entirely eliminating, the occurrence of voltage delay and irreversible Rdc growth in Li/SVO cells by subjecting them to a conditioning discharge methodology.

The discharge methodology comprises a one-time conditioning pulse discharge protocol. The current pulses are either delivered to the device being powered by the cell or to a secondary "dummy" circuit beginning at about 15% DOD, more preferably beginning at about 25% DOD, and most preferably beginning at about 30% DOD.

According to the conditioning discharge methodology of the present invention, a Li/SVO cell delivers at least two current pulses about once every one-half to five seconds, more preferably about once every one to two seconds beginning at about 30% DOD. The current pulses are about 20 mA/cm$^2$ to about 1 amp/cm$^2$, more preferably about 250 mA/cm$^2$ to about 750 mA/cm$^2$ and are separated by a rest period of about one half to five seconds. More preferably, the at least two current pulses are separated by a rest period of about one to two seconds. This current pulse regime is discontinued once capacity equivalent to about 0.2% DOD to about 10% DOD is removed from the cell.

It is within the purview of the present invention to subject a Li/SVO cell to the above described relatively short high current pulses separated by the relatively short rest period at least at about the 15% DOD to about 30% DOD life of the cell. However, if needed, the cell is subjected to the conditioning pulse discharge a second and more times in the about 15% DOD to about 80% DOD region, more preferably in the about 25% DOD to about 75% DOD region, and most preferably in the about 30% DOD to about 70% DOD region. By significantly minimizing voltage delay and Rdc growth, especially in the 35% DOD to 70% DOD region, the time to charge a capacitor is well within the device application threshold. This allows for more practical deliverable energy.

In this manner, the region of severe voltage delay and Rdc growth is by-passed. In the remaining discharge region of about 35% DOD to 70+% DOD, cell Rdc does not grow significantly, which, in turn, translates into higher pulse voltages and shorter charge times. Therefore, at least 30%+35+%=65+% of theoretical capacity is deliverable as useful energy, instead of just 35% to 40% of theoretical capacity under the traditional discharge regime in the worst case.

The following examples describe the manner and process of an electrochemical cell according to the present invention, and set forth the best mode contemplated by the inventors of carrying out the invention.

EXAMPLE I

A build up of cell resistance was obtained by immersing lithium anodes in two vanadium solutions. The solutions were prepared by stirring 0.3713 grams of vanadium(IV) fluoride (VF$_4$) or 0.2426 grams of vanadium(IV)oxide (V$_2$O$_4$) in 20 ml of PC/DME (1:1 by vol.). While stirring, the mixtures were periodically heated under low heat. The solutions were then filtered through 0.45 and then 0.2-micron syringe filters.

Anodes were prepared by brushing lithium metal over a nickel screen with a welded nickel lead. The anodes were stored in the above-described filtered V$^{+4}$ solutions overnight, and then rinsed with DME and allowed to dry. A number of test cells were assembled using these anodes. The cells contained cathodes having SVO as the active material with two layers of polypropylene separator disposed between the electrodes. The cells were then activated with an electrolyte of 1M LiAsF$_6$ PC/DME (1:1 by vol.).

Figure 2:
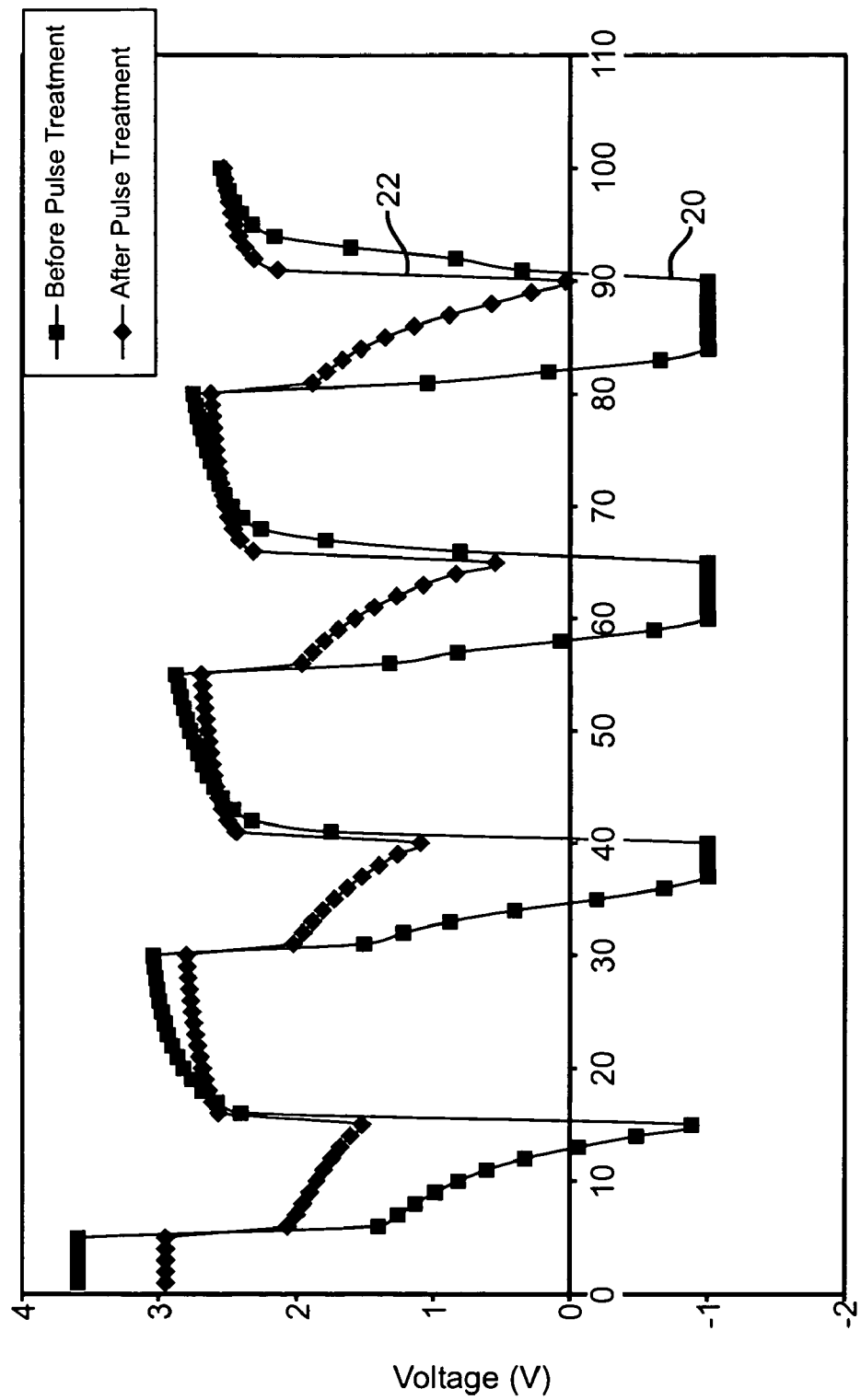
FIG. 2 is a graph constructed from the comparative discharge results of a Li/SVO cell that had its lithium anode stored in a vanadium oxide solution prior to being pulse discharged before and after a conditioning methodology of the present invention.

The thusly manufactured cells were pulse discharged using a train consisting of four 10 second pulses at a current of 278 mA separated by 15 second rest periods between pulses. This is designed to mimic the pulse discharge of a Li/SVO cell charging a capacitor in a cardiac defibrillator. The pulse train test results for the VF$_4$ and V$_2$O$_4$ stored Li/SVO cells are illustrated in FIGS. 1 and 2 as the curves designated 10 and 20, respectively. In these graphs, cell resistance build up is evident from the low pulse voltages.

EXAMPLE II

The test cells used in Example I were then subjected to an electrochemical treatment method according to the present invention. This consisted of relatively short high current pulses separated by a relatively short rest period between pulses. In particular, the cells were subjected to one second pulses at a current of 500 mA (50 mA/cm$^2$) separated by rest periods of one second. The test ended once about 130 mA of capacity, corresponding to about 0.5% DOD, was removed.

The test cells were then pulse discharged using a train consisting of four 10 second pulses at a current of 278 mA separated by 15 second rest periods between pulses. Again, this is designed to mimic the pulse discharge of a Li/SVO cell charging a capacitor in a cardiac defibrillator. The pulse train test results for the VF$_4$ and V$_2$O$_4$ stored Li/SVO cells are illustrated in FIGS. 1 and 2 as the curves designated 12 and 22, respectively. It is apparent that cell resistance was significantly reduced. In each case, cell potential decreased throughout the application of the pulse until it reached a minimum at the end of the pulse, and the minimum potential of the first pulse was higher than the minimum potential of the last pulse in the pulse series. This means that the test cells exhibited significantly reduced voltage delay during the application of the pulse train as a result of the present electrochemical treatment method. In particular, resistance was nearly eliminated in the cell containing the anode of lithium stored in the VF$_4$ PC/DME solution (FIG. 1).

It is appreciated that various modifications to the present inventive concepts described herein may be apparent to those of ordinary skill in the art without departing from the scope of the present invention as defined by the herein appended claims

What is claimed is:

1. A method for powering an implantable medical device with an electrochemical cell, the cell comprising an alkali metal anode coupled to a cathode of a cathode active material activated with an electrolyte, comprising the steps of:
    a) connecting a negative terminal and a positive terminal of the cell to the implantable medical device;
    b) powering the implantable medical device with the cell;
    c) monitoring the depth-of-discharge (DOD) of the cell; and
    d) upon the cell reaching at least about 15% DOD, discharging the cell to deliver capacity equivalent to about 0.2% DOD to about 10% DOD through the application of at least two current pulses separated by a rest period of about one-half to about five seconds.

2. A method for powering an implantable medical device with an electrochemical cell, the cell comprising an alkali metal anode coupled to a cathode of a cathode active material activated with an electrolyte, comprising the steps of:
    a) connecting a negative terminal and a positive terminal of the cell to the implantable medical device;
    b) powering the implantable medical device with the cell;
    c) monitoring the depth-of-discharge (DOD) of the cell;
    d) upon the cell reaching about 15% to about 30% DOD, causing the cell to deliver a first current pulse discharge of significantly greater amplitude than that of a pre-pulse current immediately prior to the first current pulse discharge;

e) waiting about one-half to about five seconds; and f) discharging the cell to deliver a second current pulse discharge of significantly greater amplitude than that of a pre-pulse current immediately prior to the second current pulse discharge, wherein the first and second current pulse discharges remove cumulative capacity equivalent to about 0.2% DOD to about 10% DOD from the cell.

3. The method of claim 2 including discharging the cell to deliver the first current pulse discharge and the second current pulse discharge to the implantable medical device or to a secondary load.

4. The method of claim 2 including discharging the cell to deliver about 20 mA/cm$^2$ to about 1 amp/cm$^2$ as the first current pulse discharge and second current pulse discharge.

5. The method of claim 2 including providing the cell of a lithium/silver vanadium oxide couple.

6. A method for providing electrical energy from an electrochemical cell comprising an alkali metal anode coupled to a cathode of a cathode active material activated with an electrolyte, comprising the steps of:

a) connecting a negative terminal and a positive terminal of the cell to a load;

b) powering the load with the cell;

c) upon the cell reaching about 15% depth-of-discharge (DOD) to about 30% DOD, discharging the cell to deliver a first current pulse discharge of significantly greater amplitude than that of a pre-pulse current immediately prior to the first current pulse discharge;

d) waiting about one-half to about five seconds; and e) discharging the cell to deliver a second current pulse discharge of significantly greater amplitude than that of a pre-pulse current immediately prior to the second current pulse discharge, wherein the first and second current pulse discharges remove cumulative capacity equivalent to about 0.2% DOD to about 10% DOD from the cell.

7. The method of claim 6 including discharging the cell to deliver the first current pulse discharge and the second current pulse discharge to the load being powered by the cell or to a secondary load.

8. The method of claim 6 including discharging the cell to deliver about 20 mA/cm$^2$ to about 1 amp/cm$^2$ as the first current pulse discharge and second current pulse discharge.

9. The method of claim 6 including providing the load as an implantable medical device.

10. The method of claim 6 including providing the cathode active material comprising silver vanadium oxide.

* * * * *